(12) United States Patent
Lin et al.

(10) Patent No.: US 8,088,851 B1
(45) Date of Patent: *Jan. 3, 2012

(54) POLYACRYLATE COMPOSITIONS

(75) Inventors: Chiu-Sing Lin, Rocky Hill, CT (US);
Qinyan Zhu, Cheshire, CT (US);
Robert P. Cross, Rocky Hill, CT (US)

(73) Assignee: Henkel Corporation, Rocky Hill, CT (US)

( * ) Notice: Subject to any disclaimer, the term of this patent is extended or adjusted under 35 U.S.C. 154(b) by 694 days.

This patent is subject to a terminal disclaimer.

(21) Appl. No.: 11/535,287

(22) Filed: Sep. 26, 2006

Related U.S. Application Data

(60) Provisional application No. 60/730,351, filed on Oct. 26, 2005.

(51) Int. Cl.
*C08K 5/16* (2006.01)
*C08G 18/42* (2006.01)
*C08L 83/06* (2006.01)
*C08L 47/00* (2006.01)

(52) U.S. Cl. ........ 524/186; 524/500; 524/506; 524/529; 524/539

(58) Field of Classification Search ................ 524/186, 524/500, 506, 529, 539
See application file for complete search history.

(56) References Cited

U.S. PATENT DOCUMENTS

| | | | | |
|---|---|---|---|---|
| 3,504,080 | A * | 3/1970 | Rein et al. | 264/235 |
| 4,767,809 | A * | 8/1988 | Wingrove | 524/255 |
| 4,772,031 | A * | 9/1988 | Poppo | 277/316 |
| 4,965,129 | A * | 10/1990 | Bair et al. | 428/398 |
| 6,172,150 | B1 * | 1/2001 | Kollmann et al. | 524/379 |
| 6,930,147 | B1 * | 8/2005 | Nakagawa et al. | 525/104 |

* cited by examiner

*Primary Examiner* — Karuna P Reddy
(74) *Attorney, Agent, or Firm* — Steven C. Bauman; James E. Piotrowski

(57) ABSTRACT

The present invention provides curable poly(acrylate) compositions, cured reaction products of which demonstrate improved resistance to shrinkage when exposed to hydrocarbon fluids, such as transmission fluids and oil- and fuel-based fluids.

18 Claims, No Drawings

POLYACRYLATE COMPOSITIONS

RELATED U.S. APPLICATION DATA

This application claims priority from U.S. Provisional Patent Application No. 60/730,351, filed Oct. 26, 2005.

BACKGROUND OF THE INVENTION

1. Field of the Invention

The present invention provides curable poly(acrylate) compositions, cured reaction products of which demonstrate improved resistance to shrinkage when exposed to hydrocarbon fluids, such as transmission fluids and oil- and fuel-based fluids.

2. Brief Description of Related Technology

Poly(acrylate) compositions have excellent sealing and adhesive properties, and have many commercial uses. For instance, they can be formed into gaskets which are used extensively in the automotive industry or applied as conformal coatings in electronics applications.

In use, poly(acrylate) compositions may become exposed to a variety of conditions, including exposure to hydrocarbon fluids such as fuel oil or oil-containing products, transmission fluid, and other petroleum products. Poly(acrylate) compositions, however, frequently suffer from the drawback that they shrink when exposed to hydrocarbon fluids. Such volume shrinkage can occur, for example, due to the dissolution of additives such as plasticizers in the polyacrylates composition. A commercial incident of this event occurs within the engine, specifically the engine gaskets. If the engine gaskets shrink, fluids can start leaking from the engine, which is clearly not desirable. Accordingly, it would be desirable for a polyacrylate composition to be imparted with improved shrinkage-resistance.

SUMMARY OF THE INVENTION

The present invention relates to curable poly(acrylate) polymers, which when cured exhibit volume shrinkage resistance when exposed to hydrocarbon fluids. The inclusion of certain additives in compositions of the invention can decrease or prevent volume shrinkage which occurs on exposure to hydrocarbon fluids. These additives include solid particles for absorbing hydrocarbon fluids. Proper adjustment of concentration of these additives can minimize or eliminate shrinkage of the cured reaction products when exposed to hydrocarbon fluid under condition of engine operation.

The inclusion of an anti-oxidant package into the inventive composition improves the working life of cured reaction products of the inventive composition under such conditions. The anti-oxidant of choice for the present invention includes phenylene diamines, as are described in more detail below.

In one aspect of the present invention, therefore there is provided a composition which includes:
a) a silyl-functionalized poly(acrylate); and
b) at least one phenylene diamine.

In another aspect of the present invention, the composition further includes:
c) a component or additive which absorbs hydrocarbon fluid and which reduces shrinkage of the cured composition upon exposure of the cured composition to a hydrocarbon fluid.

This component should be present in an amount sufficient to reduce shrinkage of the cured composition when exposed to a hydrocarbon fluid. Desirably, the component is constructed from a polyolefin, described in more detail below.

The invention also provides a catalyst package, which allows for the reduction of the amount of moisture cure catalyst used to achieve comparable cure results In still another aspect of the present invention, there is provided a method for preparing such a composition which includes the steps of:
a) providing a silyl-functionalized poly(acrylate); and
b) mixing the silyl-functionalized poly(acrylate) with a phenylene diamine and/or diphenyl amine compound.

DETAILED DESCRIPTION OF THE INVENTION

In one aspect of the present invention, there is provided a composition which includes:
a) a silyl-functionalized poly(acrylate); and
b) at least one phenylene diamine and/or diphenyl amine compound.

As noted, one component contained in the compositions of the present invention is a silyl functionalized poly(acrylate). The silyl-functionalization may be in the form of a pendant group or a terminal (or, end-capped) group. In some embodiments of the present invention, the poly(acrylate) may be an alkyl acrylate polymer, such as an alkyl (meth)acrylate polymer. For purposes of the present invention, the term "(meth)acrylate" includes acrylates and methacrylates.

More specifically, the backbone of the silyl-functionalized poly(acrylate) may include a homopolymer of $C_1$-$C_{10}$ (meth)acrylates or a copolymer of $C_1$-$C_{10}$ (meth)acrylates. Suitable alkyl acrylates include, but are not limited to, ethyl acrylate, butyl acrylate and 2-ethylhexyl acrylate. Copolymeric acrylate backbones may contain copolymerized units of up to 40% by weight monovinyl monomers, for example, styrene, acrylonitrile, vinylbutyl ether, acrylic acid and $C_1$-$C_{10}$ alkyl acrylates different from the principal alkyl acrylate comonomer. Such copolymers are available commercially, for example, as HYTEMPS acrylate rubbers (acrylic homopolymer and copolymer rubbers available from Nippon Zeon, KK) and TOACRON AR-601 acrylate rubbers (polyethylacrylate polymers, available from To a Paint, KK).

In other embodiments of the present invention, the poly(acrylate) may be a polyfunctional (meth)acrylate polymer. Such polymers may have a high degree of functionality due to the presence of multiple functional groups in the main chain of the polymer.

Certain of such alkyl acrylate polymers are described more fully in U.S. Pat. No. 6,506,460 to Paglia et al, which is hereby expressly incorporated here by reference herein in its entirety.

The silyl-functionalized poly(acrylate) used in the present invention may be of the following structure:

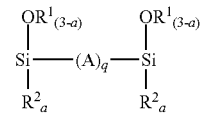

where R is H or $C_1$ to $C_4$ alkyl, a is integer from 0-3, q is an integer from 2 to about 1,000, and A is a hydrocarbon diradical containing at least one (meth)acrylate linkage. Desirably, a is 1 or 2. $R^1$ in each occurrence may be the same or different and is a $C_1$ to $C_{20}$ hydrocarbon radical. In a desirable aspect, $R^1$ is $C_1$ to $C_6$ alkyl. More desirably, $R^1$ is $C_1$ to $C_3$ alkyl.

$R^2$ in each occurrence may be the same or different, and is a $C_1$ to $C_{10}$ hydrocarbon radical. Substituent $R^2$, in combination with the oxygen to which it is attached, forms a hydrolyzable group, which provides the compositions of the present invention with their ability to undergo room temperature vulcanization ("RTV"). RTV cure typically occurs through exposure of the compositions of the present invention to moisture. The presence of hydrolyzable moisture curing groups, such as alkoxy groups, on the silicon atom permits the compositions of the present invention to crosslink. Suitable hydrolyzable groups include alkoxy groups such as methoxy, ethoxy, propoxy, and butoxy; aryl groups such as phenoxy; acyloxy groups such as acetoxy; aryloxy groups such as phenoxy; and alkoxyalkyl groups such as $CH_3OCH_2CH_2—$. Larger groups such as propoxy and butoxy are slower to react than smaller groups such as methoxy and ethoxy. Accordingly, the rate at which the compositions of the invention undergo moisture cure can be influenced by choosing appropriately sized groups for substituent $R^2$. Desirably, $R^2$ is $C_1$ to $C_4$ alkyl. More desirably, $R^2$ is methyl or ethyl.

As used herein, the term "hydrocarbon radical" is intended to refer to radicals which are primarily composed of carbon and hydrogen atoms. Thus, the term encompasses aliphatic groups such as alkyl, alkenyl, and alkynyl groups; aromatic groups such as phenyl; and alicyclic groups, such as cycloalkyl and cycloalkenyl. The term "hydrocarbon diradical" is intended to refer to the corresponding divalent radicals of these groups.

In a particularly desirable aspect, the poly(acrylate) used in the present invention is sold by Kaneka Corporation under the trade name Kaneka Telechelic Polyacrylate OR100S.

The backbone of the poly(acrylate) may be multifunctional, thereby imparting a higher degree of functionality to the polymer than the alkyl(meth)acrylate polymers described above. The monomer used to form the backbone of the polymer is not particularly restricted but a variety of monomers may be selectively employed. Suitable examples include, but are not limited to, (meth)acrylic monomers such as (meth)acrylic acid, methyl (meth)acrylate, ethyl (meth)acrylate, n-propyl (meth)acrylate, isopropyl (meth)acrylate, n-butyl (meth)acrylate, isobutyl (meth)acrylate, tert-butyl (meth)acrylate, n-pentyl (meth)acrylate, n-hexyl (meth)acrylate, cyclohexyl (meth)acrylate, n-heptyl (meth)acrylate, n-octyl (meth)acrylate, 2-ethylhexyl (meth)acrylate, nonyl (meth)acrylate, decyl (meth)acrylate, dodecyl (meth)acrylate, phenyl (meth)acrylate, tolyl (meth)acrylate, benzyl (meth)acrylate, 2-methoxyethyl (meth)acrylate, 3-methoxybutyl (meth)acrylate, 2-hydroxyethyl (meth)acrylate, 2-hydroxypropyl (meth)acrylate, stearyl (meth)acrylate, glycidyl (meth)acrylate, 2-aminoethyl (meth)acrylate, γ-(methacryloyloxypropyl) trimethoxysilane, (meth)acrylic acid-ethylene oxide adduct, trifluoromethylmethyl (meth)acrylate, 2-trifluoromethylethyl (meth)acrylate, 2-perfluoroethylethyl (meth)acrylate, 2-perfluoroethyl-2-perfluorobutylethyl (meth)acrylate, 2-perfluoroethyl (meth)acrylate, perfluoromethyl (meth)acrylate, diperfluoromethylmethyl (meth)acrylate, 2-perfluoromethyl-2-perfluoroethylmethyl (meth)acrylate, 2-perfluorohexylethyl (meth)acrylate, 2-perfluorodecylethyl (meth)acrylate, 2-perfluorohexadecylethyl (meth)acrylate, and the like. These monomers may be used each alone or a plurality of them may be copolymerized.

The poly(acrylate) may have a molecular weight distribution, i.e., the ratio of weight average molecular weight to number average molecular weight as determined by gel permeation chromatography, of less than 1.8, preferably not more than 1.7, more preferably not more than 1.6, still more preferably not more than 1.5, particularly not more than 1.4, and most preferably not more than 1.3.

Also included in the compositions of the present invention is an anti-oxidant. The anti-oxidant is either a phenylene diamine compound, such as one within structure I:

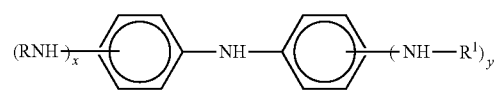

where R and $R^1$ are each members individually selected from $C_{1-12}$ alkyl, $C_{2-12}$ alkenyl, $C_{3-12}$ cyclo or bicycloalkyl, $C_{6-18}$ aryl, and derivatives thereof, and x and y are each individually 0-2, or a diphenyl amine compound, such as one within structure II:

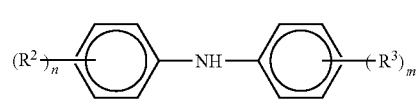

where $R^2$ and $R^3$ are each members individually selected from $C_{1-12}$ alkyl, $C_{2-12}$ alkenyl, $C_{3-12}$ cyclo or bicycloalkyl, $C_{6-18}$ aryl, and derivatives thereof, and n and m are each individually 0-5. Of course dominations of the phenylene diamine and diphenyl amine compounds may be used.

Within structure I are phenylene diamines commercially available from Chemtura Corporation, Middlebury, Conn. (under the FLEXZONE or NAUGARD trade names), R.T. Vanderbilt Company, Inc., Norwalk, Conn. (under the AGERTTE or VANOX trade names), Flexsys America, Akron, Ohio (under the SANTOFLEX trade name), or Sumitomo Chemical Company Ltd., Osaka, Japan (under the SUMILIZER trade name), such as

FLEXZONE 7

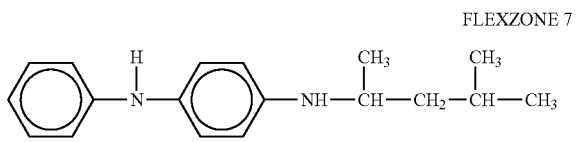

N-phenyl-N'-(1,3-dimethylbutyl)-p-phenylenediamine

FLEXZONE 11 L

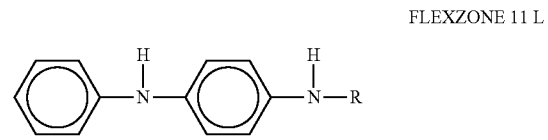

Blend of N-phenyl-N'-(1,3-dimethylbutyl)-p-phenylenediamine and N-phenyl-N'(1,4-dimethylpentyl)-p-phenylenediamine (R is thus 1,3-dimethylbutyl and 4-dimethylpentyl)

FLEXZONE 6H

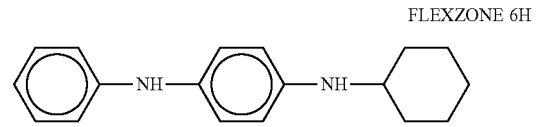

N-Cyclohexyl-N'-phenyl-p-phenylenediamine

NAUGARD J

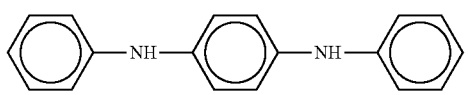

N,N'-Diphenyl-p-phenylenediamine

FLEXZONE 3C

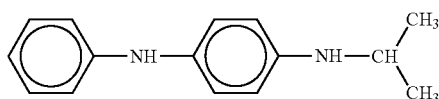

N-Isopropyl-N'-phenyl-p-phenylenediamine

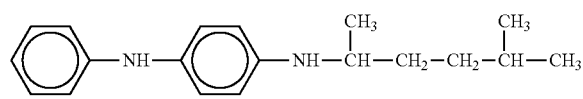

N-Phenyl-N'(1,4-dimethylpentyl)-p-phenylenediamine (one of the components of FLEXZONE II L)

Vanderbilt offers many of such products under the trade names AGERITE (such as DPPD, HIPAR T HP-S, NEPA, STALITE, STALITES, SUPERFLEX, WHITE, and WHITE WHITE) and VANOX (such as 12).

Sumitomo offers for sale many of these compound types under the SUMILIZER trade name, such as BPA, BPA-M1, 41, 4M and 9A.

Within structure II, commercially available examples include those from Chemtura (under the NAUGARD trade name), such as

NAUGARD 445

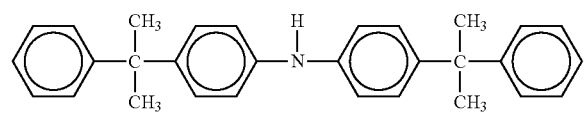

4,4'-Bis(alpha,alpha-dimethylbenzyl)diphenylamine

OCTAMINE

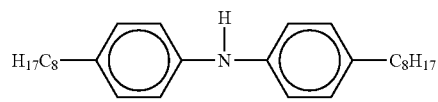

Octylated diphenylamine

The phenylene diamine compound and/or diphenyl amine compound should be used in an amount of about 0.05 to about 10% by weight, such as about 0.5 to about 3% by weight, of the composition.

In addition, as noted above, a component or additive which absorbs hydrocarbon fluid and may be included in the inventive composition at least one hydrocarbon fluid-absorbing component. The component may present when used in an amount of about 1% to about 20% by weight of the composition. Desirably, the component should be present in an amount of about 1% to about 10% by weight of the composition.

The component may be a polyolefin in particulate form, a reactive liquid, or a combination thereof. In an advantageous aspect, the polyolefin is a powder in particulate form.

When the component is a polyolefin in particulate form, it is believed that the presence of the polyolefin powder helps prevent shrinkage of the compositions of the invention by absorbing hydrocarbon fluid. Advantageously, the polyolefin is provided in the form of a particulate material or powder. The polyolefin powder will generally have an average particle size of about 0.1 to about 50 microns. Desirably, the polyolefin powder has an average particle size of about 20 microns. Polyolefin powders suitable for use in the inventive compositions typically have a melting point in the range from about 75° C. to about 175° C. When the inventive compositions have reached a temperature above the melting point of the polyolefin powder used therein, the polyolefin powder will typically be substantially dissolved in the inventive composition. A commercially available polyethylene powder suitable for the present invention are those sold under the trade name MICROTHENE by Equistar Chemical Company, with average densities ranging from 0.909 to 0.952 g/cc. Desirably, the polyolefin powder is MICROTHENE FN 510-00.

In one aspect, the polyolefin powder is comprised of a polyolefin containing repeating units of at least one $C_2$ to $C_7$ alkylene monomer.

The inventive compositions may include moisture curing catalysts to further enhance or control the cure speed. Suitable moisture-cure catalysts include, without limitation, metal compounds which contain such metals as titanium, tin, or zirconium. Illustrative examples of titanium compounds include tetraisopropoxy titanate and tetrabutoxy titanate. Illustrative examples of the tin compounds include dibutyltin dilaurate, dibutyltin diacetate, dioctyltindicarboxylate, dimethyltindicarboxylate, and dibutyltin dioctoate. Illustrative examples of the zirconium compounds include zirconium octanoate. The moisture cure catalysts may be employed in an amount sufficient to promote moisture cure, which generally is from about 0.05% to about 5% by weight, and advantageously from about 0.1% to about 1% by weight of the composition.

Use of an amine-based catalyst package together with the moisture cure catalyst allows for a lesser amount of the moisture catalyst (oftentimes as high as a 50% decrease) in order to achieve comparable cure. The amine-based catalyst package may include 1,8-diazabicyclo[5.4.0] undec-7-ene ("DBU"), tetramethylguanidine ("TMG"), and 1,5-diazabicyclo[4.3.0]non-5-ene ("DBN"). The amount of the amine-based catalyst package may be about 0.01 to about 2% by weight, such as about 0.5% by weight of the composition.

The inventive compositions may also contain one or more amino-containing silane compounds which act as adhesion promoters. These amino-containing silane compounds may be present in amounts of about 0.1% to about 5.0% by weight of the composition. Desirably, these compounds are present in amounts of about 0.5% to about 1.5% by weight of the composition. Amino-containing silane compounds which are useful in the present invention include, but are not limited to, silane compounds containing amino-alkyl groups, such as gamma-ureidopropyltrimethoxy silane, 3-aminopropyl trimethoxysilane, (3-trimethoxy silylpropyl)urea, gamma-aminopropyltrimethoxysilane, N-(2-aminoethyl)-3-aminopropyltriethoxysilane, N-(2-aminoethyl)-3-aminopropyltrimethoxysilane, trimethoxysilylpropyldiethylene triamine, tertiary alkyl carbamate silane, and aminoethyl-3-aminopropyl-methyl-dimethylsilane. Other desirable amino-containing silane compounds include silane compounds containing aminocycloaliphatic groups such as methyl tris (cyclohexylamino) silane and silane compounds containing amino-aromatic groups, such as methyl tris-(N-methylbenzamido)silane. Adhesion promoters may be present in amounts of up to about 5%, and desirably up to about 2% by weight of the composition.

Examples of useful commercially available adhesion promoters include octyl trimethoxysilane (commercially available from Chemtura Corporation, Middlebury, Conn. under the trade designation A-137), glycidyl trimethoxysilane (commercially available from Chemtura under the trade designation A-187), methacryloxypropyl trimethoxysilane (commercially available from Chemtura under the trade designation of A-174), vinyl trimethoxysilane, tetraethoxysilane and its partial condensation products, and combinations thereof.

The inventive compositions may also contain other additives so long as they do not inhibit the curing mechanism, elongation, or intended use. For example, conventional additives such as fillers, adhesion promoters, pigments, moisture scavengers, inhibitors, odor masks, and the like may be included. Plasticizers such as alkylsulfonic acid phenyl esters are useful in the present invention. Moisture scavengers such as methyltrimethoxysilane and vinyltrimethyloxysilane are also useful in the present invention.

The polymeric matrix useful in the present invention must be present in a sufficient amount to render the normally flowable primer composition non-flowable at temperatures of at least about room temperature and more desirably at temperatures of at least about in the range of 70° F. (21° C.) to about 180° F. (82° C.) and even more desirably greater than 120° F. (49° C.) to about 160° F. (71° C.).

The polymeric matrix includes an organic material, which generally has a melting point or softening point range in the range of about 200° F. (93° C.) to about 500° F. (260° C.), more desirably greater than 250° F. (121° C.) to about 500° F. (260° C.) Polymeric materials useful in the present invention may be selected for instance from polyamides, polyacrylamides, polyimides, polyhydroxyalkylacrylates, urea-urethanes, hydroxy or amine modified aliphatic hydrocarbons (such as castor oil-based rheological additives), liquid polyester-amide-based rheological additives and combinations thereof. Of particular utility are polyamide materials having a melting point of about 260° F. (127° C.) One such polyamide is commercially available as a non-reactive free flowing powder under the trade name DISPARLON, such as 6100, 6200 or 6500, from King Industries Specialties Company, Norwalk, Conn. The recommended use in accordance with commercially available data sheets for DISPARLON 6200 is for epoxy adhesive and potting compounds in amounts of about 0.5% to about 3% by weight; the recommended use in accordance with commercially available data sheets for DISPARLON 6500 is for epoxy adhesive and potting compounds in amounts of about 0.5% to about 3% by weight.

The present invention includes the presence of the polymeric matrix in amounts of about 2.5% to about 20%, for instance about 5% to about 15%, such as about 7% to about 10%, by weight of the total composition. When present in these amounts, the non-flowability characteristics of a composition can be obtained with minimal undesirable effects, such as loss of substantial tensile properties or sealing characteristics. Additionally, these materials can be added directly in solid form, such as in powder or particulate form, without pre-melting of the particles.

The polyamide materials desirably have a particle size less than about 15 microns, although other particle sizes are useful. As previously mentioned, the melting or softening point of the polymeric matrix materials ranges from about 200° F. (93° C.) to about 500° F. (260° C.). In a particularly desirable embodiment, a polyamide having a melting point of about 250° F.-270° F. (121° C.-132° C.) and desirably about 260° F. (127° C.) is employed.

Commercially available examples of hydroxyl or amine modified aliphatic hydrocarbons and liquid polyester-amide based rheological additives include THIXCIN R, THIXCIN GR, THIXATROL ST and THIXATROL GST from Rheox Inc., Hightstown, N.J. These modified aliphatic hydrocarbons are castor oil based materials. The hydroxyl modified aliphatic hydrocarbons are partially dehydrated castor oil or partially dehydrated glycerides of 12-hydrostearic acid. These hydrocarbons may be further modified with polyamides to form polyamides of hydroxyl stearic acid are described as being useful polyamides. Liquid polyester-amide based rheolgical additives include THIXATROL TSR, THIXATROL SR and THIXATROL VF rheological additives available from Rheox Inc., Hightstown, N.J. These rheological additives are described to be reaction products polycarboxylic acids, polyamines, alkoxylated polyols and capping agents. Useful polycarboxylic acids include sebacic acid, poly(butadiene) dioic acids, dodecane dicarboxylic acid and the like.

As a basic filler, the present composition may also include a precipitated calcium carbonate. Any commercially available precipitated calcium carbonate can be used with the present invention. The precipitated calcium carbonate should be present, for example, in an amount from about 5 to about 60% by weight of the total composition. Desirably, the calcium carbonate is present in an amount from about 20 to about 40% by weight of the composition.

In another aspect, the present invention relates to a composition which includes:
 a) a silyl-functionalized poly(acrylate)
 b) at least one phenylene diamine and/or diphenyl amine compound; and
 c) a component which absorbs hydrocarbon fluid and reduces shrinkage of the cured composition when exposed to a hydrocarbon fluid.

This latter component is desirably constructed from a polyolefin, as described herein.

The present invention also relates to a method of preparing such composition, the method including the steps of:
 a) providing a silyl-functionalized poly(acrylate); and
 b) mixing a silyl-functionalized the poly(acrylate) with a phenylene diamine and/or diphenyl amine compound. A component that absorbs hydrocarbon fluid reduces shrinkage of the cured composition when exposed to a hydrocarbon fluid may also be provided, as noted above.

In another aspect, the present invention relates to a method of using the compositions of the present invention, the method including the steps of:

a) providing an inventive composition;
b) permitting the composition to cure; and
c) exposing the cured composition to a hydrocarbon fluid.

The compositions of the present invention may also be formed into many different configurations before curing. These articles may be used in various industries where there is a need for oil-shrinkage resistant elastomeric articles. In the vehicular assembly industry, for example, O-rings, hoses, seals, and gaskets can be formed from the present compositions. Other conventional uses requiring good adhesive properties, as well as oil-shrinkage resistance are also contemplated for the inventive compositions.

In another aspect of the present invention, there is provided a method of applying a silicone composition to a surface that is exposed to oil during its intended use. The surface to which the present compositions are applied can be any work surface that is exposed to oil, such as certain work surfaces of conventional internal combustion engines. This method includes applying a composition of the present invention to the work surface.

The work surface may be constructed of a variety of materials, such as most metals, glass, and commodity or engineered plastics.

The present invention may be illustrated further by reference to the following Examples.

EXAMPLES

Tables 1A and 1B show the components used to formulate compositions of the present invention, and comparable compositions without an antioxidant package (in the form of phenylene diamines) and without a component which absorbs hydrocarbon fluid and/or reduces shrinkage of the cured composition upon exposure of the cured composition to a hydrocarbon fluid, showing each of their respective % by weight, based on the total composition. Formulations A and D are control compositions with a component which absorbs hydrocarbon fluid and/or reduces shrinkage of the cured composition upon exposure of the cured composition to a hydrocarbon fluid (MICROTHENE-brand polyolefin powder), though lacking the presence of an anti-oxidant package (a phenylene diamine, a diphenyl amine, or combinations thereof). Formulations B and C are control compositions and lack the presence of the component which absorbs hydrocarbon fluid and/or reduces shrinkage of the cured composition upon exposure of the cured composition to a hydrocarbon fluid (MICROTHENE-brand polyolefin powder) and an anti-oxidant package (phenylene diamine). Formulations E-H are compositions within the scope of the invention having 2 percent by weight of the anti-oxidant package (a phenylene diamine, a diphenyl amine, or combinations thereof).

TABLE 1A

| Component | A | B | C | D |
|---|---|---|---|---|
| Silyl end-capped polyacrylate polymer[1] | 44.50 | 45.00 | 41.24 | 40.00 |
| aluminum powder in mineral oil | 0.50 | 0.50 | | |
| Microthene ® FN 510-00 | 2.00 | | | 3.00 |
| Disparlon ® 6500 | | | 2.06 | 2.00 |
| Alkylsulfonic acid phenyl ester | 8.00 | 8.00 | 15.46 | 15.00 |
| Calcium Carbonate | 41.00 | 43.00 | 33.71 | 32.70 |
| Graphite | | | 0.52 | 0.50 |
| Irganox ® 1010[2] | 1.00 | 1.00 | 4.12 | 4.00 |

TABLE 1A-continued

| Component | A | B | C | D |
|---|---|---|---|---|
| Aminopropyltrimethoxysilane | 1.00 | 1.00 | 1.03 | 1.00 |
| Vinyltrimethoxysilane | 1.00 | 1.00 | 1.03 | 1.00 |
| Dibutyltindilaurate | 1.00 | 0.50 | 0.83 | 0.80 |
| Total (%) | 100.00 | 100.00 | 100.00 | 100.00 |

[1]Kaneka Polyacrylate OR100S
[2]Tetrakis [methylene (3,5-di-t-butyl-4-hydroxy-hydrocinnamate)methane]

TABLE 1B

| Component | E | F | G | H |
|---|---|---|---|---|
| Silyl end-capped polyacrylate polymer | 47.40 | 47.40 | 47.40 | 42.00 |
| Aluminum powder in mineral oil | 0.5 | 0.5 | 0.5 | 0.5 |
| MICROTHENE FN 510-00 | 3 | 3 | 3 | 3.0 |
| DISPARLON 6500 | 2 | 2 | 2 | 2.0 |
| Alkylsulfonic acid phenyl ester | 13 | 13 | 13 | 13.0 |
| Calcium Carbonate | 28.4 | 28.4 | 28.4 | 34.7 |
| Graphite | 0.5 | 0.5 | 0.5 | — |
| Aminopropyltrimethoxysilane | 0.4 | 0.4 | 0.4 | 1.0 |
| Vinyltrimethoxysilane | 0.1 | 0.1 | 0.1 | 1.0 |
| Dibutyltindilaurate | 0.4 | 0.4 | 0.4 | 0.8 |
| NAUGARD N445 | 2 | 0 | 1 | 1.0 |
| FLEXONE 11L | 0 | 2 | 1 | 1.0 |
| DBU | 0.4 | 0.4 | 0.4 | — |
| Silica | 1 | 1 | 1 | — |

A typical procedure for preparing these formulations is as follows:

A mixer was charged with the silyl-functionalized poly (acrylate) and the antioxidant was mixed into the silyl-functionalized poly(acrylate). While gradually heating the mixture to a temperature of 100° C., calcium carbonate, graphite, and the polyolefin powder were added to the mixer. The mixture was stirred at high speed under vacuum at a temperature of 110° C. for a period of time of 2 hours. The mixture was cooled to a temperature of about 55° to 60° C., and the mixture was then stirred under vacuum for a period of time of about 10 minutes. The mixture was then further cooled to room temperature (40° to 50° C.), at which point aminopropyltrimethoxysilane, vinyltrimethoxysilane, and dibutyltindilaurate were added under nitrogen, and the mixture was stirred for a period of time of about 15 minutes. Stirring continued under vacuum for a period of time of about 15 minutes.

Table 2 shows the change in volume of samples of Formulations A and B (evaluated in triplicate) from Table 1 when exposed to hydrocarbon fluids. Formulations A1-A3 contain a polyolefin powder, while Formulations B1-B3 do not. As can be seen from the results, there is significantly less shrinkage in the formulations containing the polyolefin powder than those that do not when measuring swelling and weeping.

TABLE 2

| Formulation. | % Swell | % Weep |
|---|---|---|
| A1 | −2.454 | −0.048 |
| A2 | −2.528 | −0.089 |
| A3 | −2.620 | −0.136 |
| B1 | −6.306 | −0.371 |
| B2 | −6.290 | −0.255 |
| B3 | −6.252 | −0.232 |

Oil submersion sample data ere obtained after cured samples of Formulations C and D were submerged in General Motors transmission fluid ETL 9097, for a period of time of 48 hours at a temperature of 150° C. Cooling period data were obtained after the oil containing the samples was allowed to cool to room temperature over a period of time of 48 hours.

Table 3 shows the change in volume of Formulations C and D after being submerged in Oil 1 or Oil 2 for a period of time of one week at a temperature of 150° C. As can be seen from the data, shrinkage of Formulation D is significantly less than that of control Formulation C, in terms of swelling. Oil 1 is transmission fluid sold under the trade name RDL 3434 by General Motors. Oil 2 is transmission fluid sold under the trade name ETL 9588, also by General Motors.

TABLE 3

|  | Formulation C (% swell) | Formulation D (% swell) |
|---|---|---|
| Oil 1 | −21.00 | −9.02 |
| Oil 2 | −22.39 | −9.59 |

With reference to Table 4 below, cured samples of Formulations E-G were heat aged at a temperature of 50° C. for the time period defined, and application (or extrusion) rate ("AR") data (illustrative of the shelf life) and skin over time ("SOT") data (illustrative of the ability of the formulation to cure) obtained and listed in minutes as the unit of measure.

The AR data was collected by extruding the samples out through a 3.17 mm diameter nozzle at a pressure of 90 psi.

The SOT data was collected by practicing generally the test method defined by ASTM 721.

TABLE 4

| | | Time Period @ 50° C./Minutes | | | | |
|---|---|---|---|---|---|---|
| Formulation | Method | Initial | 1 weeks | 2 weeks | 3 weeks | 4 weeks |
| E | AR | 40 | 21 | 15 | 12 | 11 |
|   | SOT | 150 | 100 | 110 | 70 | 78 |
| F | AR | 35 | 19 | 13 | 15 | — |
|   | SOT | 145 | 120 | 135 | 45 | — |
| G | AR | 40 | 27 | 29 | — | 20 |
|   | SOT | 145 | 100 | 125 | — | 125 |

In Table 5 below, physical properties were evaluated for cured samples of Formulations E-G. More specifically, Shore A hardness, tensile strength (and percent changes therein after heat aging), modulus at 100% (and percent changes therein after heat aging), elongation (and percent changes therein after heat aging), adhesion between pairs of aluminum and stainless steel substrates, and failure mode are reported initially after curing for 7 days at a temperature of 23° C. and 50% relative humidity, then after a period of time of one week at a temperature of 150° C., and then again after a period of time of six weeks at that temperature.

TABLE 5A

| Physical Property | Formulation | | |
|---|---|---|---|
| Initial | E | F | G |
| Shore A | 31 | 32 | 32 |
| Tensile | 158 | 153 | 187 |
| Mod @ 100% | 76 | 67 | 92 |
| Elongation | 299 | 321 | 233 |
| Adh. Al/Al (psi) | 166 | 165 | 156 |
| % CF | 100 | 100 | 100 |

TABLE 5A-continued

| Physical Property | Formulation | | |
|---|---|---|---|
| Initial | E | F | G |
| Adh. ST/ST (psi) | 162 | 171 | 159 |
| % CF | 100 | 100 | 100 |

TABLE 5B

| Physical Property | Formulation | | |
|---|---|---|---|
| 1 Week Heat @ 150° C. | E | F | G |
| Shore A | 41 | 38 | 44 |
| Tensile | 332 | 359 | 340 |
| Mod @ 100% | 153 | 133 | 159 |
| Elongation | 184 | 202 | 183 |
| % Change in Tensile | 110 | 135 | 82 |
| % Change in Mod @ 100% | 101 | 99 | 73 |
| % Change in Elongation | −38 | −37 | −21 |

TABLE 5C

| Physical Property | Formulation | | |
|---|---|---|---|
| 6 Week Heat @ 150° C. | E | F | G |
| Shore A | 50 | 50 | 53 |
| Tensile | 465 | 519 | 428 |
| Mod @ 100% | 356 | 441 | 339 |
| Elongation | 130 | 115 | 122 |
| % Change in Tensile | 194 | 239 | 129 |
| % Change in Mod @ 100% | 368 | 558 | 269 |
| % Change in Elongation | −57 | −64 | −48 |

The initial physical properties, as shown in Table 5A, indicate that Formulation G demonstrates the highest tensile strength and modulus values of the three formulations but the lowest elongation values. Upon heat aging at 150° C. for up to 6 weeks, Formulation G showed the least amount of change in properties of the three formulations evaluated.

What is claimed is:

1. An uncured gasket composition curable at room temperature on a first sealing surface, comprising:

(a) a (meth)acrylate component comprising a silyl-functionalized poly(acrylate) having the structure,

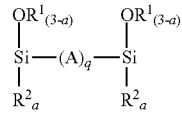

wherein each $R^1$ is independently selected from a $C_1$ to $C_6$ alkyl, each $R^2$ is independently selected from a $C_1$ to $C_{10}$ alkyl, a is integer from 0-3, q is an integer from 2 to about 1,000, and A is a hydrocarbon diradical containing at least one (meth)acrylate linkage;

(b) at least one of a phenylene diamine within structure I or a diphenyl amine within structure II, wherein structure I comprises:

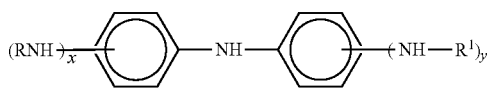

wherein R and R¹ are each members individually selected from the group consisting of $C_{1-12}$ alkyl, $C_{2-12}$ alkenyl, $C_{3-12}$ cyclo or bicycloalkyl, $C_{6-18}$ aryl, and derivatives thereof, and x and y are each individually 0-2;

structure II comprises:

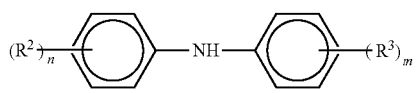

wherein $R^2$ and $R^3$ are each members individually selected from the group consisting of $C_{1-12}$ alkyl, $C_{2-12}$ alkenyl, $C_{3-12}$ cyclo or bicycloalkyl, $C_{6-18}$ aryl, and derivatives thereof, and n and m are each individually 0-5; and combinations thereof; and (c) at least one component which reduces shrinkage of the cured composition upon exposure of the cured composition to a hydrocarbon fluid, wherein the component is present in an amount sufficient to reduce shrinkage of the cured composition when exposed to a hydrocarbon fluid.

2. The composition according to claim 1, wherein the phenylene diamine is represented by a member selected from the group consisting of:

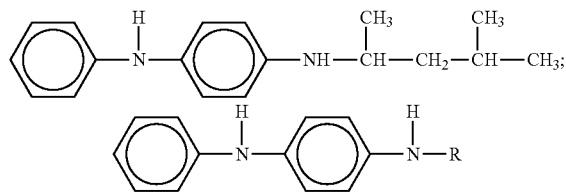

(R is 1,3-dimethylbutyl or 4-dimethylpentyl);

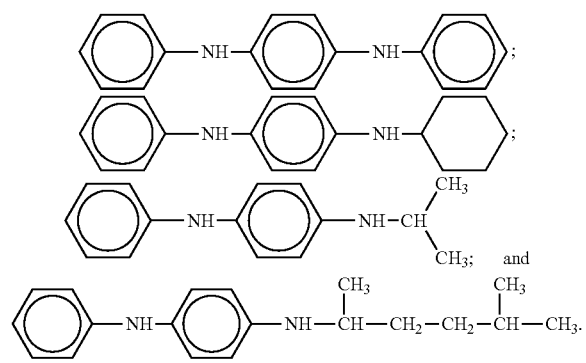

3. The composition according to claim 1, wherein the diphenyl amine is represented by a member selected from the group consisting of:

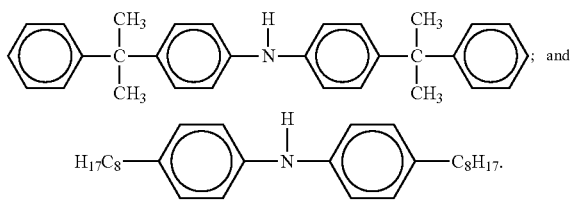

4. Reaction products of the composition according to claim 1.

5. The composition of claim 1, wherein the component which reduces shrinkage is a polyolefin added to the composition in particulate form.

6. The composition of claim 5, wherein the polyolefin is substantially dissolved in the composition.

7. The composition of claim 5, wherein the polyolefin in particulate form is comprised of a polyolefin containing repeating units of at least one $C_2$ to $C_7$ alkene monomer.

8. The composition of claim 1, wherein the component which reduces shrinkage is present in an amount of about 1% to about 20% by weight of the composition.

9. The composition of claim 5, wherein the component which reduces shrinkage has an average particle size of about 0.1 to about 50 microns.

10. The composition of claim 1, further comprising a moisture-cure catalyst or an amine-based catalyst.

11. The composition of claim 5, wherein the hydrocarbon fluid-absorbing component which reduces shrinkage is polyethylene in particulate form.

12. The composition according to claim 1, comprising both of a phenylene diamine within structure I and a diphenyl amine within structure II.

13. A gasket formed by the cured reaction products of the composition of claim 1 sealingly engaged between the first sealing surface and a second sealing surface.

14. A method of making an automotive engine gasket comprising:
   providing a first surface designed to be sealed to a mating surface;
   disposing the composition of claim 1 on the first surface;
   moving one of the sealing surfaces adjacent the other sealing surface so that the composition is disposed between the sealing surfaces; and
   curing the composition;
   wherein reaction products of the composition form a seal between the sealing surfaces.

15. The method of claim 14 wherein the step of disposing comprises disposing composition around a periphery of the first sealing surface.

16. The method of claim 14 wherein the step of disposing comprises disposing composition around a periphery of the first sealing surface and subsequently contacting the disposed composition to the mating sealing surface before curing.

17. A motorized vehicle component, comprising:
   a first portion having a first predefined sealing surface fluidly connected to an internal chamber;
   a second portion having a second predefined sealing surface adjacent the first sealing surface and fluidly connected to the chamber; and
   a cured reaction product of a curable gasket composition disposed between the first and second sealing surfaces and in contact with the chamber to seal the chamber, the curable gasket composition comprising,
   (a) a (meth)acrylate component comprising a silyl-functionalized poly(acrylate) having the structure,

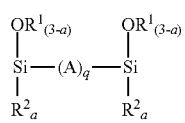

wherein each $R^1$ is independently selected from a $C_1$ to $C_6$ alkyl, each $R^2$ is independently selected from a $C_1$ to $C_{10}$ alkyl, a is integer from 0-3, q is an integer from 2 to about 1,000, and A is a hydrocarbon diradical containing at least one (meth)acrylate linkage; and (b) at least one of a phenylene diamine within structure I or a diphenyl amine within structure II, wherein structure I comprises:

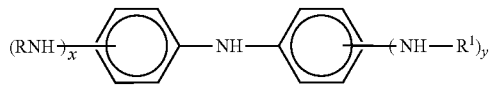

wherein R and $R^1$ are each members individually selected from the group consisting of $C_{1-12}$ alkyl, $C_{2-12}$ alkenyl, $C_{3-12}$ cyclo or bicycloalkyl, $C_{6-18}$ aryl, and derivatives thereof, and x and y are each individually 0-2; structure II comprises:

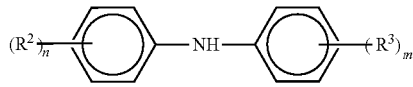

wherein $R^2$ and $R^3$ are each members individually selected from the group consisting of $C_{1-12}$ alkyl, $C_{2-12}$ alkenyl, $C_{3-12}$ cyclo or bicycloalkyl, $C_{6-18}$ aryl, and derivatives thereof, and n and m are each individually 0-5; and combinations thereof; and (c) at least one component which reduces shrinkage of the cured composition upon exposure of the cured composition to a hydrocarbon fluid, wherein the component is present in an amount sufficient to reduce shrinkage of the cured composition when exposed to a hydrocarbon fluid.

18. The component of claim 17 wherein the phenylene diamine represented by a member selected from the group consisting of:

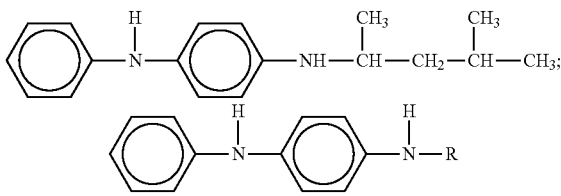

(R is 1,3-dimethylbutyl or 4-dimethylpentyl);

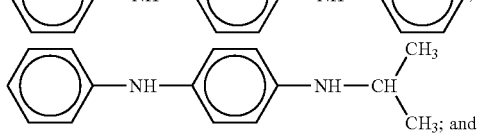

and wherein the component which reduces shrinkage is a polyolefin.

* * * * *